United States Patent

Dahm et al.

[11] Patent Number: 6,037,404
[45] Date of Patent: Mar. 14, 2000

[54] RHEOLOGY-INFLUENCING COMPOSITION FOR COATING MEDIA

[75] Inventors: Ralf Dahm, Wermelskirchen; Carmen Flosbach; Hermann Kerber, both of Wuppertal; Sandra Kirchgässler; Dieter Lerch, both of Köln; Frank Schnödewind, Heinsberg; Walter Schubert, Wuppertal, all of Germany

[73] Assignee: Herberts Gesellschaft mit beschränkter Haftung, Wuppertal, Germany

[21] Appl. No.: 09/089,754

[22] Filed: Jun. 2, 1998

[30] Foreign Application Priority Data

Jun. 10, 1997 [DE] Germany ............... 197 24 408

[51] Int. Cl.[7] ............... C08J 3/00; C08K 3/20; C08L 75/00; C08F 8/30; C08G 18/08
[52] U.S. Cl. ............... 524/590; 524/591; 525/123; 525/125; 525/131; 528/49
[58] Field of Search ............... 525/123, 125, 525/131; 524/590, 591; 528/49

[56] References Cited

U.S. PATENT DOCUMENTS

| 3,371,056 | 2/1968 | Delius . |
| 4,540,734 | 9/1985 | Short et al. . |
| 5,391,620 | 2/1995 | Bederke et al. ............... 525/123 |

FOREIGN PATENT DOCUMENTS

| 0 192 304 | 8/1986 | European Pat. Off. . |
| 0 198 519 | 10/1986 | European Pat. Off. . |
| 0 435 428 | 7/1991 | European Pat. Off. . |
| 27 51 761 | 6/1978 | Germany . |
| 42 36 901 | 5/1994 | Germany . |
| 5-17707 | 1/1993 | Japan . |

OTHER PUBLICATIONS

Aug. 1998, European Search Report.

*Primary Examiner*—Patrick D. Niland
*Attorney, Agent, or Firm*—Schwegman, Lundberg, Woessner & Kluth P.A.

[57] ABSTRACT

This invention relates to a composition, and to the preparation and use of thereof said composition being suitable as a rheology influencer for coating media and comprising the reaction product formed by reaction of a mixture of components A, B and C with components D, E and F. Components A, B and C form a mixture wherein component A is one or more (meth)acrylic copolymers and/or one or more polyesters which contain hydroxyl groups. Component B is a copolymer of ethylhexyl (meth)acrylate and one or more hydroxyalkyl (meth)acrylates, as well as $\alpha,\beta$-unsaturated monomers which are different therefrom. Component C is a hydroxy—functional microdispersion which is produced by polymerizing hydroxylalkyl (meth)acrylates in combination with unsaturated monomers in a mixture of polyesters or polyacrylates containing carboxyl and/or hydroxyl groups. Component D is one or more aliphatic polyisocyantes and component E is $\epsilon$-caprolactam. The caprolactam partially blocks the polyisocyanate. The component F is one or more primary amines. These ingredients are combined in certain specified amounts. The invention also relates to coating media and to the production of these coating media, which contain said composition as a rheology influencer.

18 Claims, No Drawings

RHEOLOGY-INFLUENCING COMPOSITION FOR COATING MEDIA

This invention relates to a composition for coating media, which enables runoff-resistant coatings based on pigmented or non-pigmented coating media to be obtained.

By influencing the rheology, i.e. by converting a coating medium which exhibits quasi-Newtonian flow behaviour into one which exhibits plastic or pseudo-plastic flow behaviour, runoff of the coating medium can be prevented, particularly on vertical surfaces, at edges and in beads. Coating media which are treated in this manner are used in particular when lacquer systems comprising thick coats are employed, or when high-solids, low molecular weight heat-curable lacquers are used, which exhibit a pronounced runoff tendency. There are numerous literature references on this subject, e.g. DE-A 27 51 761, EP-A 0 192 304, EP-A 0 198 519, EP-A 0 435 428.

These literature references describe the formation of di- or polyurea compounds by the reaction of primary or secondary mono-, di- or polyamines or alcohol amines with mono-, di- or triisocyanates in a carrier resin which is added to the lacquer. The polyurea compounds give rise to the formation of hydrogen bonds, the network of which, which is formed after application, stabilises the lacquer film on vertical surfaces for example. The runoff-resistance of wet lacquer films is also due to this effect of polyurea compounds.

DE-A 27 51 761 relates to a thixotropic composition, which in addition to a binder vehicle contains a "run control agent" which is formed by the reaction of a diisocyanate, e.g. the trimer of hexamethylene-1,6-diisocyanate, with benzylamine. EP-A 0 198 519 describes the use of polyurea compounds for thixotropic compositions which are produced by the reaction of symmetrical aliphatic or homocyclic (cycloaliphatic aromatic) diisocyanates with ether amines. In EP-A 0 192 304, polyurea compounds are employed for thixotropic coating media based on trimeric isocyanates formed from an isocyanate comprising 3 to 20 carbon atoms and a primary amine; monoamines can also be used. EP-A 0 435 428 claims the use of polyurea compounds which are formed from what are preferably isocyanurate trimers and primary and/or secondary monoamines, for example aliphatic monoamines.

An appropriate particle size is necessary to maintain a constant mode of action of solid polyurea compounds. In order to produce this particle size for the known polyurea compounds it is necessary to use high stirring speeds, and to employ special stirrers and metering devices. Moreover, not all customary lacquer monoalcohols can be used without having a disadvantageous effect on the rheology. In general, it has to be taken into account when using these known polyureas that smooth film surfaces cannot be obtained, which results in reduced gloss and brilliance.

DE 42 36 901 relates to a rheology composition, which in addition to (meth)acrylic copolymers and/or polyesters contains an OH-functional microdispersion as well as diisocyanates and aliphatic primary monoamines. The use of aromatic diisocyanates here can result in a yellowing of the coating. The rheological properties achieved are also in need of improvement.

The object of the present invention is therefore to provide coating media, which ensure a high runoff-resistance during application and during the stoving operation, and which at the same time exhibit good flow behaviour, which results in smooth, defect-free surfaces. Moreover, the rheology composition should exhibit improved ease of incorporation in the coating medium and should prevent yellowing of the coating, particularly that caused by UV radiation or thermal loading, or that caused during the stoving operation.

This object can be achieved by the provision of coating media which contain a rheology composition which is based on special urea compounds, which are bonded to a hydroxy-functional acrylic dispersion.

The present invention further relates to the rheology-influencing composition. This rheology composition is obtainable by the provision of A) one or more (meth)acrylic copolymers which contain hydroxyl groups and/or one or more polyesters which contain hydroxyl groups and which have a hydroxyl number of 30 to 200 mg KOH/g and a carboxyl group content corresponding to an acid number of 0 to 50 mg KOH/g, B) one or more copolymers of ethylhexyl (meth)acrylate and one or more hydroxyalkyl (meth)acrylates, as well as α,β-unsaturated monomers which are different therefrom, and C) a hydroxy-functional microdispersion, obtainable by the provision of a solution of one or more polyesters and/or (meth)acrylic copolymers which contain carboxyl and/or hydroxyl groups, wherein up to half of the polyester and/or copolymer molecules may each be esterified with one molecule of maleic acid or maleic anhydride, and the polymerisation in this preparation of one or more hydroxyalkyl (meth)acrylates in admixture with one or more unsaturated monomers which are different therefrom, and reaction of the mixture of A), B) and C) with D) one or more aliphatic polyisocyanates, E) ε-caprolactam, and F) one or more primary monoamines, which may be present in admixture with part of component A), B) and/or of the soluble fraction of component C), preferably in a ratio of monoamine to component A), B) and/or C) of 9:1 to 1:1, wherein the amount of (meth)acrylic copolymers and/or polyesters which is contained in components A), B), C), and F) is 50 to 80% by weight, the amount of polymers B) is 5 to 30% by weight, the amount of microparticles contained in C) is 1 to 5% by weight, the amount of polyisocyanates D) is 7 to 33% by weight, the amount of ε-caprolactam E) is 2 to 9% by weight, and the amount of primary monoamines F) is 1 to 5% by weight, wherein the percentages by weight are given with respect to the solids content in each case and add up to 100% by weight, and wherein the composition may also contain pigments, extenders, customary lacquer additives and/or solvents.

Component C) is a microdispersion of solid microparticles in a soluble fraction which optionally contains solvent. The proportion of solid particles can be determined in an ultracentrifuge, for example.

According to one preferred embodiment, component B) is obtainable by the polymerisation of a mixture of a) 20 to 50% by weight of ethylhexyl (meth)acrylate, b) 30 to 60% by weight of one or more hydroxyalkyl (meth)acrylates, c) 15 to 40% by weight of alpha,beta-unsaturated monomers which are different therefrom, and d) 0 to 4% by weight of (meth)acrylic acid.

According to a particularly preferred embodiment, a mixture of a) 31.2% by weight of ethylhexyl (meth)acrylate, b) 43.7% by weight of one or more hydroxyalkyl (meth)acrylates, c) 24.3% by weight of alpha,beta-unsaturated monomers which are different therefrom, and d) 0.8% by weight of acrylic acid is polymerised for the production of component B).

Component C) is preferably obtainable by the provision of a solution comprising e) 15 to 85% by weight of one or more polyesters and/or (meth)acrylic copolymers which contain hydroxyl and/or carboxyl groups, wherein up to half the polyester and/or copolymer molecules may each be esterified with one molecule of maleic acid, and the polymerisation in this preparation of f) 15 to 85% by weight of one or more hydroxyalkyl (meth)acrylates and one or more unsaturated monomers which are different therefrom.

According to another preferred embodiment, the monomers of component f), which may be polymerised by a radical mechanism, are a mixture of f1) 80 to 100% by weight of one or more hydroxyalkyl (meth)acrylates, and f2) 0 to 20% by weight of one or more other unsaturated monomers.

According to a further preferred embodiment, components D), E) and F), which in total contain 7 to 24% by weight of diisocyanate (D), 2 to 9% by weight of $\epsilon$-caprolactam (E) and 1 to 5% by weight of one or more aliphatic primary monoamines and/or hydroxylamines (F), are added to the preparation comprising components A), B) and C).

The preparation of the rheology composition is effected, for example, in reaction vessels which can be heated and cooled, and which are fitted with a stirrer, thermometer and reflux condenser, with the placement in the reaction vessel of one or more dissolved copolymers and/or polyesters A), one or more polymers B) and microdispersion C) and with the addition of polyisocyanate D) and of $\epsilon$-caprolactam E) at temperatures of 20 to 40° C., preferably 30° C. The use of $\epsilon$-caprolactam effects a partial blocking of the diisocyanate. It is advantageous to effect reaction of components D) and F) separately and to feed the at least partially capped polyisocyanate which results therefrom to the preparation comprising A), B) and/or C. Thereafter, the primary monoamine F) is added, wherein component F) is added continuously, either with a portion of the binder vehicles which contain hydroxyl groups, comprising component A), B) and/or C), or with an inert organic solvent, over a period of 2 to 5 hours, preferably 3 hours. Thereafter, the batch is reacted further for about 2 hours and is diluted with customary lacquer solvents to the desired processing concentration. The ratio of component F) to the portion of components A), B) and/or C) preferably falls within the range from 9:1 to 1:1.

During the rheology composition production process, organic solvents are used for the solvation and production of individual components, for example of components A), B) and C), and for dilution. These solvents can also be used subsequently in the coating media according to the invention. They may be customary lacquer technology solvents, for example glycol ethers, esters, ketones, alcohols, aromatic and aliphatic hydrocarbons, individually or in admixture. Aprotic solvents are preferred.

The rheology composition according to the invention, together with customary binder vehicles containing hydroxyl groups, can be used for the production of the coating media according to the invention. Examples of binder vehicles containing hydroxyl groups which can be used include customary film-forming agents, for example those based on (meth)acrylic copolymers, polyesters, polyurethanes or epoxy resins which contain hydroxyl groups and which are familiar to one skilled in the art. The same copolymers and polyesters which contain hydroxyl groups and which are used for component A) can also be used as binder vehicles. The coating media can be formulated with crosslinking agents in the usual manner.

Production of the (meth)acrylic copolymer (components A) and d)) which is contained in the rheology composition according to the invention can be effected by polymerisation by customary methods, e.g. by bulk, solution or pearl polymerisation. The solution polymerisation method is preferred. In this method, the solvent is placed in the reaction vessel and heated to its boiling temperature, and the mixture of monomers is continuously added, in admixture with an initiator, over a defined period. Per- and azo compounds are suitable initiators, and the type and amount thereof are selected so that a supply of radicals which is as constant as possible is present during the addition phase. An amount of 0.2 to 8% by weight of initiators with respect to the monomers weighed in is preferably used.

The aforementioned lacquer technology solvents can be used as organic solvents. The polymerisation reaction may proceed with the assistance of chain transfer agents, for example mercaptans, chlorinated hydrocarbons or cumene.

The polymerisation conditions such as the reaction temperature, the period of running in the monomer mixture and the solution concentration, are selected so that the (meth)acrylic copolymers have a number average molecular weight of 1500 to 30,000 (determined by gel permeation chromatography using polystyrene as a calibration substance). The glass transition temperature preferably falls within a range from $-20°$ C. to $+80°$ C.

The preferred monomers for the production of the (meth) acrylic copolymers are alkyl esters and hydroxyalkyl esters of acrylic acid and/or methacrylic acid, optionally in addition to other $\alpha,\beta$-unsaturated monomers and/or optionally acrylic acid and/or methacrylic acid. Examples of long chain, branched or unbranched alkyl esters include alkyl (meth)acrylates comprising $C_8$–$C_{18}$ in their alkyl part, e.g. ethylhexyl (meth)acrylate, octyl (meth)acrylate, lauryl acrylate, 3,5,5-trimethylhexyl (meth)acrylate and isobornyl acrylate. Examples of short- and medium-chain branched or unbranched alkyl esters include alkyl (meth)acrylates comprising $C_1$–$C_7$ in their alkyl part, e.g. methyl (meth)acrylate, ethyl (meth)acrylate, butyl (meth)acrylate, pentyl (meth) acrylate and cyclohexyl (meth)acrylate. Examples of hydroxyalkyl esters containing a primary hydroxy group include $\beta$-hydroxyethyl acrylate, 1,4-butanediol monoacrylate, 1,6-hexane diol monomethacrylate and hydroxyoctyl acrylate. Reaction products of hydroxyalkyl (meth)acrylates with $\epsilon$-caprolactone can also be used. Examples of hydroxyalkyl esters comprising a secondary hydroxyl group include hydroxypropyl (meth)acrylate, addition products of glycidyl (meth)acrylate and saturated short-chain fatty acids such as acetic acid, addition products of Cardura E (a glycidyl ester of versatic acid) with unsaturated COOH— functional compounds such as (meth)acrylic acid, crotonic acid or maleic acid or with the corresponding anhydrides, as well as the reaction products of glycidyl (meth)acrylate with saturated, branched or unbranched fatty acids, such as butanoic acid, caproic acid, lauric acid and stearic acid.

In addition, comonomers can be used, for example styrene, styrene derivatives and vinyl esters, in amounts up to 50% by weight with respect to the total weight of monomers.

For the introduction of carboxyl groups, (meth)acrylic acid or reaction products of hydroxyalkyl (meth)acrylates with dicarboxylic acid anhydrides can be incorporated by polymerisation in amounts such that an acid number of 0 to 50 mg KOH/g is obtained.

The polyesters which are used as component A) are polycondensation products of polyvalent polycarboxylic acids or anhydrides thereof and polyhydric polyols, optionally with the use of monocarboxylic acids. Polyesters of this type are preferably produced using an excess of alcohol. Their OH numbers generally fall within the range from 30 to 200 mg KOH/g, preferably 60 to 160 mg KOH/g, and their acid numbers range from 0 to 50 mg KOH/g. However, a procedure can be employed during production in which free carboxyl groups corresponding to an acid number of 1 to 50 mg KOH/g, preferably 5 to 30 mg KOHI/g, are retained. This can be effected, for example, by incomplete esterification or by the use of monomers containing carboxyl groups, for example dihydroxycarboxylic acids such as dimethylpropionic acid, or tricarboxylic acids.

The number average molecular weight is 1000 to 6000, preferably 1000 to 3000.

Examples of suitable polycarboxylic acids include orthophthalic anhydride, isophthalic acid, tetrahexahydrophthalic acid, 1,4-cyclohexane dicarboxylic acid, 4-methylhexahydrophthalic acid, succinic acid (anhydride) adipic acid, sebacic acid or dimeric fatty acid.

Examples of suitable alcohol components include ethylene glycol, polyethylene glycols, butanediols, neopentyl glycol, cyclohexane dimethanol, trimethylpentane-diol, trimethylolethane-glycerol, pentaerythritol and trishydroxyethyl isocyanurate.

The polyesters may also contain small proportions of maleic acid or maleic anhydride. Natural and synthetic monocarboxylic acids may also optionally be used together with the aforementioned polycarboxylic acids, for example benzoic acid, tertiary butyl benzoic acid, lauric acid, and fatty acids from naturally occurring oils.

The polyesters may contain glycidyl esters of $\alpha,\alpha$-disubstituted monocarboxylic acids and $\epsilon$-caprolactone as modification components.

The polymers B) which are used according to the invention can be produced by known polymerisation methods, such as those described above for component A) according to the invention. In the course of this procedure, a mixture of monomers is preferably used which comprises a) 20 to 50% by weight of ethylhexyl (meth)acrylate,
b) 30 to 60% by weight of one or more hydroxyalkyl (meth)acrylates,
c) 15 to 40% by weight of $\alpha,\beta$-unsaturated monomers which are different therefrom, and
d) 0 to 4% by weight of (meth)acrylic acid.

Examples of monomer components b) and c) which can be used are the monomer components described above for component A).

Dispersions C) according to the invention can be prepared, for example, by the formation of a disperse phase of uncrosslinked (meth)acrylic copolymers f) in the dissolved (meth)acrylic copolymer and/or polyester e).

Examples of polyesters which are suitable as component e) include the esterification products of aliphatic and/or cycloaliphatic polyols and aliphatic, cycloaliphatic and/or aromatic polycarboxylic acids, such as those which are customary for lacquer technology purposes. They may have hydroxyl and acid numbers corresponding to those of component A), for example.

The (meth)acrylic copolymers which can be used as component f) may have a number average molecular weight (Mn) and OH numbers and acid numbers corresponding to those of component A). These are copolymers which are customary for lacquer purposes, and are obtainable, for example, by the radical copolymerisation of $\alpha,\beta$-olefinically unsaturated monomers, such those described above for component A) for example.

The major constituents of disperse phase e) are hydroxyalkyl esters of acrylic acid and methacrylic acid.

Up to half of the molecules of the polyesters and/or (meth)acrylic copolymers of component e) may each be esterified with one molecule of maleic acid or maleic anhydride. Esterification is preferably effected with maleic acid.

Preparation of dispersion C) is preferably effected by radical polymerisation, for example by the provision of binder vehicle matrix d) in solvated form and heating it to the reaction temperature, and adding a monomer/initiator mixture continuously to the disperse phase e) over 2 to 8 hours for example. If a half ester is formed with maleic acid, phase e) is treated, before the addition, with the corresponding amount of maleic anhydride and is esterified at 100 to 120° C., for example. Polymerisation is conducted at temperatures between 60 and 160° C., for example. The solvents which have already been cited above can be used as organic solvents.

As has been described above for the production of component A), chain transfer agents can be used in conjunction for the production of component C), in order to regulate the molecular weight. Examples include mercaptans and chlorinated hydrocarbons.

The polymerisation conditions are selected so that polymer microparticles are produced without problems. The particle size preferably falls within the range from 50 to 800 nm, preferably 200 to 500 nm.

The glass transition temperature of the disperse phase of component C) preferably falls within a range from –40° C. to +60° C.

According to the invention, aliphatic polyisocyanates which are obtained by the trimerisation of aliphatic and cycloaliphatic diisocyanates are used as component D). Examples thereof include trimers (isocyanurate and biurets) of hexamethylene diisocyanate, 3,3,5-trimethylhexamethylene diisocyanate, tetramethylhexamethylene diisocyanate, isophorone diisocyanate, methylene-bis-(4-isocyanatocyclohexane) and 1,4-diisocyanatocyclohexane. Hexamethylene diisocyanate trimer is preferably used. Mixtures of hexamethylene diisocyanate trimer with other aliphatic diisocyanates can also be used.

The polyisocyanates which are used according to the invention are partially blocked by the $\epsilon$-caprolactam used according to the invention. The partial blocking of the NCO groups amounts to 50 to 75%.

In order to form di-substituted ureas, the aliphatic polyisocyanate is reacted with primary monoamines. Monoamines of this type may be n-alkylamines, such as n-butyl, n-hexyl, n-octyl and n-stearylamine, preferably n-octylamine and n-decylamine; hydroxyalkylamines, such as hydroxyethylamine, hydroxypropylamine, and hydroxybutylamine, preferably hydroxyethylamine, or n-alkyl-aryl-amines, such as benzylamine for example.

In order to produce the coating media according to the invention, the rheology compositions according to the invention can be treated with one or more customary binder vehicles containing hydroxyl groups. Examples of binder vehicles of this type include binder vehicles based on (meth)acrylic copolymers, polyesters, polyurethanes and epoxy resins, such as those which are common in the lacquer industry. They may also be binder vehicles corresponding to component A) of the rheology composition according to the invention. The coating media can be formulated in the usual manner with customary crosslinking agents such as aminoplastic resins or polyisocyanates for example. Examples of suitable aminoplastic resins include alkylated condensates which are produced by the reaction of aminotriazines and amidotriazines with aldehydes.

Customary aliphatic, cycloaliphatic and aromatic polyisocyanates can be used as polyisocyanates, for example hexamethylene diisocyanate, isophorone diisocyanate, and polyisocyanates containing biuret or isocyanurate groups.

In addition to the aforementioned solvents, the coating media may contain additional customary lacquer additives, for example flow enhancers, plasticisers, anti-settling agents and hardening accelerators. Furthermore, customary lacquer extenders and pigments, e.g. transparent or covering inorganic and/or organic colouring pigments, may also be used.

Application of the coating media according to the invention is effected by customary methods, e.g. by manual spraying, automated spraying or by electrostatic application (ESTA).

The coating media according to the invention result in coatings which impart a particularly good runoff-resistance to clear and covering lacquer coats, especially in stoving processes. A high runoff-resistance is even ensured for the liquid lacquers. In this respect, it could not have been anticipated that, in addition to a high runoff-resistance, good flow behaviour would be achieved without the formation of runs at sharp edges, beads and grooves. Furthermore, the rheology compositions according to the invention can be incorporated particularly well in the remaining coating medium constituents. No yellowing of the coatings occurs, either during the stoving operation, on irradiation with UV light, or even on weathering in the open.

The following examples serve to explain the invention.
Preparation of component B):

EXAMPLE 1

200 g solvent naphtha and 20 g n-butyl acetate were placed in a 2 liter, three-necked flask fitted with a stirrer, thermometer, condenser and two dropping funnels, and were heated to 142° C. A mixture of monomers comprising 5 g acrylic acid, 148 g isobutyl acrylate, 190 g 2-ethylhexyl methacrylate and 267 g 2-hydroxypropyl methacrylate were added drop-wise over 6 hours, simultaneously with an initiator solution comprising 10 g di.-tert.-butyl peroxide, 30 g tert.-butyl peroctoate and 30 g solvent naphtha. After the addition was complete, the dropping funnel was rinsed with 30 g n-butyl acetate, and the batch was thereafter polymerised for a further 6 hours. The conversion was then about 98%. The product was subsequently diluted with 50 g n-butyl acetate and 20 g solvent naphtha to a solids content of 65%.
Preparation of component C:

EXAMPLE 2

616 g of a polyester which contained hydroxyl groups (acid number=5 mg KOH/g, OH number=110 mg KOH/g, as a 65% solution in xylene), 34 g xylene, 20 g n-butyl acetate and 7.5 g maleic anhydride were placed in a 2 liter, three-necked flask fitted with a stirrer, thermometer, condenser and two dropping funnels and heated to 115° C. 238 g 2-hydroxyethyl acrylate were added drop-wise over 2.5 hours, simultaneously with an initiator solution comprising 4.5 g tert.-butyl peroctoate and 30 g butyl acetate. After the addition was complete, the dropping funnel was rinsed with 25 g n-butyl acetate, and the batch was thereafter polymerised for a further 2 hours. The conversion was then about 98%. The product was subsequently diluted with 25 g n-butyl acetate to a solids content of 65%.
Preparation of component D/E:

EXAMPLE 3

150 g xylene, 90 g methoxypropyl acetate, 564 g of trimeric hexamethylene diisocyanate (as a 90% solution in n-butyl acetate/solvent naphtha (1:1)) and 196 g ε-caprolactam were placed in a were placed in a 2 liter, three-necked flask fitted with a stirrer, thermometer and condenser and heated to 60° C. with stirring. The heater was then switched off. The temperature rose to 75° C. due to the exothermic reaction. The reaction mixture was held at 75° C. until an NCO number of 3.8 was reached. Thereafter, the batch was cooled to 40° C. and drawn off. The solids content was about 70%.
Preparation of the rheology compositions:

EXAMPLE 4

10 parts by weight of the (meth)acrylic copolymer from Example 1 were placed in a mixing vessel, and 38 parts by weight of a polyester which contained hydroxyl groups was added as component A (acid number=20.3 mg KOH/g, OH number=80 mg KOH/g, as a 65% solution in xylene), together with 2 parts by weight of the microdispersion from Example 2 and 4.3 parts by weight of solvent naphtha, using a high-speed stirrer (stirring speed 800 rpm). 15 parts by weight of the partially capped polyisocyanate from Example 3 were subsequently stirred into the batch, and a mixture of 1.1 parts by weight n-octylamine and 1.1 parts by weight solvent naphtha was added. The reaction mixture was held for 60 minutes at 30–35° C. It was then mixed with 20 parts by weight of the aforementioned polyester which contained hydroxyl groups and was diluted with 8.5 parts by weight solvent naphtha. A rheology composition was obtained which had a solids content of 60.4%, a viscosity η of 1320 mPa.s, and a shear stress τ of 17.5 Pa at a shear rate of $(15s)^{-1}$.

EXAMPLE 5

10 parts by weight of the (meth)acrylic copolymer from Example 1 were placed in a mixing vessel, and 24 parts by weight of a polyester which contained hydroxyl groups were added as component A (acid number=20.3 mg KOH/g, OH number=80 mg KOH/g, as a 65% solution in xylene), together with 16 parts by weight of a styrene-free (meth) acrylic copolymer as a further component A (acid number=27.6 mg KOH/g, OH number=132 mg KOH/g, as a 65% solution in solvent naphtha), 2 parts by weight of the microdispersion from Example 2 and 4.3 parts by weight of solvent naphtha, using a high-speed stirrer (stirring speed 800 rpm). 15 parts by weight of the partially capped polyisocyanate from Example 3 were subsequently stirred into the batch, and a mixture of 1.1 parts by weight n-octylamine and 1.1 parts by weight solvent naphtha was added. The reaction mixture was held for 60 minutes at 30–35° C. It was then mixed with 10 parts by weight of the aforementioned polyester which contained hydroxyl groups and with 10 parts by weight of the aforementioned (meth)acrylic copolymer, and was diluted with 6.5 parts by weight solvent naphtha. A rheology composition was obtained which had a solids content of 60.1%, a viscosity η of 1640 mPa.s, and a shear stress τ of 24.8 Pa at a shear rate of $(15s)^{-1}$.

EXAMPLE 6

17 parts by weight of the (meth)acrylic copolymer from Example 1 were placed in a mixing vessel, and 30 parts by weight of a (meth)acrylic copolymer were added as component A (20% styrene, acid number=23.1 mg KOH/g, OH number=140 mg KOH/g, as a 60% solution in solvent naphtha/n-butanol (34:6)), together with 1.3 parts by weight of the microdispersion (Example 2) and 5 parts by weight of solvent naphtha, using a high-speed stirrer (stirring speed 800 rpm). 15 parts by weight of the partially capped polyisocyanate from Example 3 were subsequently stirred into the batch, and a mixture of 1.1 parts by weight n-octylamine and 1.1 parts by weight solvent naphtha was added. The reaction mixture was held for 60 minutes at 30–35° C. It was then mixed with 27.5 parts by weight of the aforementioned (meth)acrylic copolymer and was diluted with 2 parts by weight solvent naphtha. A rheology composition was obtained which had a solids content of 58.0%, a viscosity $\eta$ of 2140 mPa.s, and a shear stress $\tau$ of 32.2 Pa at a shear rate of $(15s)^{-1}$.

EXAMPLE 7

16 parts by weight of the (meth)acrylic copolymer from Example 1 were placed in a mixing vessel, and 30 parts by weight of a (meth)acrylic copolymer were added as component A (16% styrene, acid number=21.8 mg KOH/g, OH number=120 mg KOH/g, as a 62% solution in solvent naphtha/n-butanol (32:6)), together with 1.3 parts by weight of the microdispersion from Example 2 and 4 parts by weight of solvent naphtha, using a high-speed stirrer (stirring speed 800 rpm). 15 parts by weight of the partially capped polyisocyanate from Example 3 were subsequently stirred into the batch, and a mixture of 1.1 parts by weight n-octylamine and 1.1 parts by weight solvent naphtha was added. The reaction mixture was held for 60 minutes at 30–35° C. It was then mixed with 30 parts by weight of the aforementioned (meth)acrylic copolymer and was diluted with 1.5 parts by weight solvent naphtha. A rheology composition was obtained which had a solids content of 62.1%, a viscosity $\eta$ of 2060 mPa.s, and a shear stress $\tau$ of 30.9 Pa at a shear rate of $(15s)^{-1}$.

Preparation of coating media:

EXAMPLE 8

42.3 parts by weight of the rheology composition from Example 4 were homogeneously mixed, simply by stirring, with 30.7 parts by weight of a (meth)acrylic copolymer (27% styrene, acid number=7.2 mg KOH/g, OH number=137 mg KOH/g, as a 55% solution in n-butyl acetate/solvent naphtha/xylene (28:11:6)), 9 parts by weight n-butyl acetate, 0.9 parts by weight of a light stabiliser of the benzotriazole type, 0.9 parts by weight of a light stabiliser of the HALS type, 1.4 parts by weight of a silicone oil (as a 10% solution in xylene), 3.7 parts by weight butyl glycol acetate, 8 parts by weight solvent naphtha and 3.1 parts by weight n-butyl acetate.

EXAMPLE 9

27.8 parts by weight of the rheology composition from Example 6 were homogeneously mixed, simply by stirring, with 26.8 parts by weight of a (meth)acrylic copolymer (20% styrene, acid number=23.1 mg KOH/g, OH number=140 mg KOH/g, as a 60% solution in solvent naphtha/n-butanol (34:6)), 21.9 parts by weight of a butylated melamine resin as a 63% solution in n-butanol/xylene (23:14), 0.8 parts by weight of a light stabiliser of the benzotriazole type, 0.8 parts by weight of a light stabiliser of the HALS type, 1.6 parts by weight of a silicone oil (as a 10% solution in xylene), 4 parts by weight butyl glycol acetate, 14.3 parts by weight solvent naphtha and 2 parts by weight n-butanol.

Preparation of a hardener solution:

EXAMPLE 10

50 parts by weight of an aliphatic polyisocyanate based on hexamethylene diisocyanate were homogeneously mixed with 10 parts by weight xylene, 23 parts by weight solvent naphtha, 4 parts by weight methoxypropyl acetate, 9 parts by weight n-butyl acetate, 3.85 parts by weight ethoxypropyl acetate and 0.15 parts by weight of 10% dibutyltin dilaurate.

Application:

The coating medium from Example 8 was mixed with the hardener solution from Example 10 shortly before processing, and was applied by spraying, by the wet-into-wet method, to a solvent-based base lacquer coat. After a ventilation phase of 10 minutes, it was hardened for 45 minutes at 80° C. The applied lacquer films exhibited very good flow, were hard and brilliant, and were resistant to runoff up to 70 $\mu$m.

The coating medium from Example 9 was applied by spraying, by the wet-into-wet method, to a solvent-based base lacquer coat. After a ventilation phase of 5 minutes, it was hardened for 20 minutes at 140° C. The applied lacquer films exhibited very good flow, were hard and brilliant, and were resistant to runoff up to 60 $\mu$m.

We claim:

1. A composition suitable as a rheology influencer for coating media, which comprises a reaction product of a mixture of components A), B) and C) with components D), E) and F) wherein component A) is one or more (meth)acrylic copolymers which contain hydroxyl groups and/or one or more polyesters which contain hydroxyl groups and which have a hydroxyl number of 30 to 200 mg KOH/g and a carboxyl group content corresponding to an acid number of 0 to 50 mg KOH/g, component B) is one or more copolymers of
  a) 20 to 50% by weight of ethylhexyl (meth)acrylate
  b) 30 to 60% by weight of one or more hydroxyalkyl (meth)acrylates,
  c) 15 to 40% by weight of $\alpha,\beta$-unsaturated monomers which are different therefrom, and
  d) 0 to 4% by weight of (meth)acrylic acid wherein the weight percentages of a), b), c) and d) are relative to the total weight of component B, component C) is a hydroxy-functional microdispersion, comprising a solution of an hydroxypolymer and a preparation of one or more polyesters and/or (meth)acrylic copolymers which contain carboxyl and/or hydroxyl groups, wherein up to half of the polyester and/or copolymer molecules may each be esterified with one molecule of maleic acid or maleic anhydride, the hydroxypolymer being prepared by the polymerisation, in the preparation, of one or more hydroxyalkyl (meth)acrylates in admixture with one or more unsaturated monomers which are different therefrom, component D) is one or more aliphatic polyisocyanates,
component E) is $\epsilon$-caprolactam, and
component F) is one or more primary monoamines, and
wherein the amount of (meth)acrylic copolymers and/or polyesters which is contained in components A), B), C)

is 50 to 80% by weight, the amount of polymers B) is 5 to 30% by weight, the amount of microparticles contained in C) is 1 to 5% by weight, the amount of diisocyanates D) is 7 to 33% by weight, the amount of ε-caprolactam E) is 2 to 9% by weight, and the amount of primary monoamines F) is 1 to 5% by weight, wherein the percentages by weight are given with respect to the solids content in each case and add up to 100% by weight.

2. A composition suitable as a rheology influencer for coating media according to claim 1, in which component F) is used in admixture with part of components A), B) and/or of the soluble fraction of component C) in a ratio of component F) to components A), B) and/or C) of 9:1 to 1:1.

3. A composition suitable as a rheology influencer for coating media according to claim 1, which contains pigments, extenders, customary lacquer additives and/or solvents.

4. A composition suitable as a rheology influencer for coating media according to claim 1, wherein the preparation of component C) is
15 to 85% by weight of one or more polyesters and/or (meth)acrylic copolymers which contain hydroxyl and/or carboxyl groups, wherein up to half the polyester and/or copolymer molecules may each be esterified with one molecule of maleic acid,
and the hydroxypolymer of component C is prepared by polymerizing 15 to 85% by weight of one or more hydroxyalkyl (meth)acrylates and one or more unsaturated monomers which are different therefrom,
the weight percentages being relative to the total weight of component C.

5. A composition suitable as a rheology influencer for coating media according to claim 4, wherein the monomers used to form the hydroxypolymer of component C are a mixture of
80 to 100% by weight of one or more hydroxyalkyl(meth) acrylates, and
0 to 20% by weight of one or more other unsaturated monomers.

6. A composition suitable as a rheology influencer for coating media according to claim 1, wherein one or more (meth)acrylic copolymers are used as component A) which have a number average molecular weight of 1500 to 30,000 and a glass transition temperature of −20° C. to +80° C.

7. A composition suitable as a rheology influencer for coating media according to claim 1, wherein one or more polyesters are used as component A) which have an OH number of 30 to 200 mg KOH/g, an acid number of 0 to 50 mg KOH/g and a number average molecular weight of 1000 to 6000.

8. A composition suitable as a rheology influencer for coating media according to claim 1, wherein a hydroxy-functional microdispersion is used as component C) in which the microparticles have a particle size of 50 to 800 nm and the glass transition temperature of the disperse phase falls within a range from −40° C. to +60° C.

9. A composition suitable as a rheology influencer for coating media according to claim 1, wherein an aliphatic polyisocyanate is used as component D) and is partially blocked with ε-caprolactam.

10. A composition suitable as a rheology influencer for coating media according to claim 1, wherein a primary monoamine is used as component F) which contains 4 to 18 carbon atoms in its molecule.

11. A coating medium comprising a composition according to claim 1 as a rheology influencer, and one or more binder vehicles which contain hydroxyl groups, and one or more crosslinking agents.

12. A method of preparing a composition according to claim 1, which comprises
providing a preparation of 15 to 85% by weight of one or more polyesters and/or (meth)acrylic copolymers which contain hydroxyl and/or carboxyl groups, wherein up to half the polyester and/or copolymer molecules may each be esterified with one molecule of maleic acid, and polymerizing, in the preparation, 15 to 85% by weight of one or more hydroxyalkyl (meth) acrylates and one or more unsaturated monomers which are different therefrom to produce component C),
mixing component A, component B and component C to produce a mixture,
wherein the amount of (meth)acrylic copolymers and/or polyesters which is contained in components A), B), C) is 50 to 80% by weight, the amount of polymers in component B) is 5 to 30% by weight, the amount of microparticles in component C) is 1 to 5% by weight,
reacting the mixture with components D and E wherein
component D) is 7 to 33% by weight of one or more aliphatic polyisocyanates and
component E) is 2 to 9% by weight ε-caprolactam, to produce a blocked intermediate and reacting the blocked intermediate with component F wherein
component F) is 1 to 5% by weight of one or more primary monoamines, which are optionally mixed with a portion of the hydroxyl-containing binder vehicles taken from A), B) and/or C) before the reaction of the mixture of A), B) and C) with D) and E),
wherein the percentages by weight are given with respect to the solids content in each case and add up to 100% by weight.

13. A method according to claim 12, wherein component F is a mixture of
80 to 100% by weight of one or more hydroxyalkyl(meth) acrylates, and
0 to 20% by weight of one or more other unsaturated monomers.

14. A method of producing a coating medium according to claim 12, comprising mixing the composition prepared according to claim 13 with one or more binder vehicles which contain hydroxyl groups and with one or more crosslinking agents.

15. A composition according to claim 9 wherein the aliphatic polyisocyanate is a hexamethylene diisocyanate trimer.

16. A composition according to claim 10 wherein the primary amine contains 8 to 10 carbon atoms in its molecule.

17. A coating medium according to claim 11 further comprising one or more pigments, extenders, lacquer additives and/or solvents.

18. A method according to claim 14 wherein one or more pigments, extenders, lacquer additives and/or solvents are also mixed with the composition.

* * * * *